United States Patent
Wu et al.

(10) Patent No.: US 8,400,726 B1
(45) Date of Patent: Mar. 19, 2013

(54) CONTROLLING PREAMBLE TARGET AMPLITUDE

(75) Inventors: Zheng Wu, San Jose, CA (US); Jason Bellorado, Santa Clara, CA (US); Marcus Marrow, Santa Clara, CA (US)

(73) Assignee: Link_A_Media Devices Corporation, Santa Clara, CA (US)

( * ) Notice: Subject to any disclaimer, the term of this patent is extended or adjusted under 35 U.S.C. 154(b) by 115 days.

(21) Appl. No.: 13/015,492

(22) Filed: Jan. 27, 2011

Related U.S. Application Data (60) Provisional application No. 61/337,016, filed on Jan. 28, 2010.

(51) Int. Cl.
*G11B 5/09* (2006.01)

(52) U.S. Cl. .................................................. 360/32

(58) Field of Classification Search .................. 360/32, 360/40, 39; 375/229, 235, 343, 376
See application file for complete search history.

(56) References Cited

U.S. PATENT DOCUMENTS

| | | | | |
|---|---|---|---|---|
| 4,733,301 A | * | 3/1988 | Wright, Jr. | 348/731 |
| 4,748,684 A | * | 5/1988 | Wright, Jr. | 455/182.3 |
| 4,860,321 A | * | 8/1989 | von der Embse | 375/343 |
| 5,073,907 A | * | 12/1991 | Thomas, Jr. | 375/376 |
| 6,044,112 A | * | 3/2000 | Koslov | 375/235 |
| 6,597,526 B1 | * | 7/2003 | Gray | 360/40 |
| 7,042,286 B2 | * | 5/2006 | Meade et al. | 330/149 |
| 7,173,966 B2 | * | 2/2007 | Miller | 375/229 |

* cited by examiner

*Primary Examiner* — Fred Tzeng
(74) *Attorney, Agent, or Firm* — Van Pelt, Yi & James LLP (57) ABSTRACT

A target amplitude for an acquisition gain-loop is determined. A tracking gain-loop is configured to adjust a gain of the tracking gain-loop during a data portion of the received signal, wherein the received signal comprises an acquisition portion and the data portion. An acquisition gain-loop is configured to adjust a gain of the acquisition gain-loop during the acquisition portion of the received signal. A detector is configured to detect in the data portion an occurrence of a pattern identical to a portion of the acquisition portion. An amplitude estimation block is configured to compute an amplitude estimate based at least in part on the detected portion. A target amplitude updating block is configured to update the target amplitude based at least in part on the amplitude estimate.

28 Claims, 10 Drawing Sheets

702 — Run a tracking gain-loop during the user data portion of a sector

704 — Detect occurrences of a pattern identical to a portion of the preamble portion in the user data portion 706 — Determine for each occurrence of the detected pattern a corresponding set of ADC samples at the output of the ADC 708 — Determine amplitude estimates based on the determined sets of ADC samples 710 — Update the preamble target amplitude

CONTROLLING PREAMBLE TARGET AMPLITUDE

CROSS REFERENCE TO OTHER APPLICATIONS

This application claims priority to U.S. Provisional Patent Application No. 61/337,016 entitled CONTROLLING PREAMBLE TARGET AMPLITUDE filed Jan. 28, 2010 which is incorporated herein by reference for all purposes.

BACKGROUND OF THE INVENTION

In a recording system, the signal read from a disk is first amplified by a pre-amplifier. The signal then passes through an analog front end (AFE) before it is sampled by an analog-to-digital converter (ADC). The AFE includes a variable-gain amplifier (VGA) to scale the signal range at the input of the ADC to effectively utilize the full range of the ADC; otherwise, quantization noise and saturation of the output of the ADC can severely degrade the performance of the system.

In some magnetic recording systems, the information stored in a sector of a disk includes an acquisition portion and a user data portion. In some embodiments, the acquisition portion is a preamble. The preamble precedes the data portion, and the preamble's data pattern is known. For example, the preamble may comprise repetitions of the bit pattern [+1 +1 −1 −1]. Some systems may have a preamble gain-loop to adjust the VGA gain during the preamble and a tracking gain-loop to adjust the VGA gain during the user data portion of the sector. The preamble gain-loop adjusts the VGA gain such that the preamble amplitude at the input of the ADC converges to a targeted value, i.e., the preamble target amplitude $A_t$. Existing techniques for determining the preamble target amplitude $A_t$ have a number of drawbacks. Thus, improved techniques for determining the preamble target amplitude $A_t$ would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

In various embodiments, the techniques described herein are implemented in a variety of systems or forms. In some embodiments, the techniques are implemented in hardware as an application-specific integrated circuit (ASIC) or a field-programmable gate array (FPGA). In some embodiments, a processor (e.g., an embedded one such as an ARM core) is used where the processor is provided or loaded with instructions to perform the techniques described herein. In some embodiments, the technique is implemented as a computer program product which is embodied in a computer readable storage medium and comprises computer instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
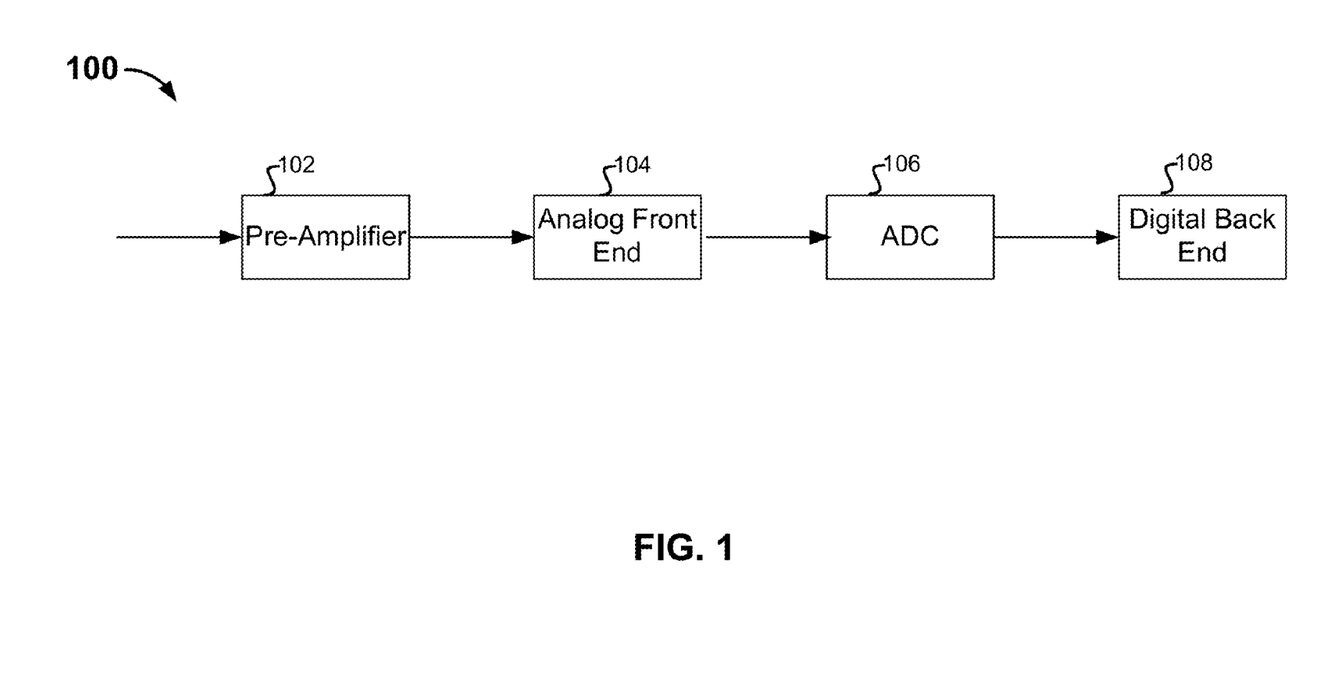
FIG. 1 is a block diagram illustrating an embodiment of a recording system.

FIG. 1 is a block diagram illustrating an embodiment of a recording system 100. As shown, the signal read from a disk is first amplified by a pre-amplifier 102. The amplified signal then passes through an analog front end (AFE) 104 before it is sampled by an analog-to-digital converter (ADC) 106. Because ADC 106 has a limited dynamic range, AFE 104 includes a variable-gain amplifier (VGA) to scale the signal range at the input of ADC 106 so as to effectively utilize the full range of ADC 106 for best signal resolution; otherwise, quantization noise and saturation of the output of ADC 106 can severely degrade the performance of the system.

In the example shown, the system 100 is used to read data from storage media (e.g., Flash storage or magnetic disk storage). In some other embodiments, the techniques described herein are used in a communications system and are implemented in a wired or wireless transmitter and/or receiver.

Figure 2:
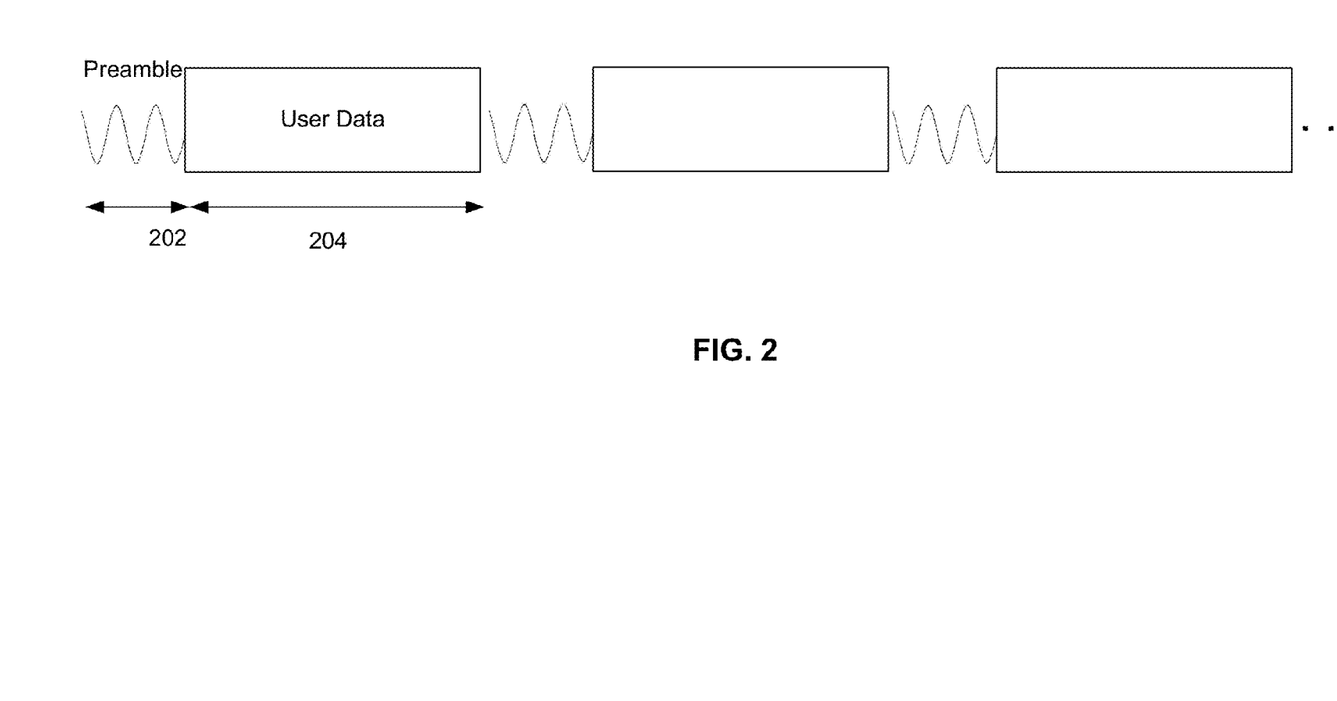
FIG. 2 is a diagram illustrating a signal read from a plurality of sectors on a magnetic disk.

FIG. 2 is a diagram illustrating a signal read from a plurality of sectors on a magnetic disk. In magnetic recording systems, a sector is a subdivision of a track on a magnetic disk. In some magnetic recording systems, the information stored in a sector of a disk includes an acquisition portion and a user data portion. In some embodiments, the acquisition portion is a preamble. Each sector has a preamble sequence 202 (hereinafter referred to as a preamble), followed by recorded user data 204 (hereinafter referred to as the user data portion). In some embodiments, preamble 202 is 84 bits long and user data portion 204 is 32K bits long. Preamble 202 is a sequence with a known data pattern. In some embodiments, preamble 202 includes a repetition of the pattern [+1 +1 −1 −1]. Because of inter-symbol interference (ISI) within the signal, the preamble waveform is approximately a sine-wave, as shown in FIG. 2. Preamble 202 may be used to synchronize the sampling phase. A frequency offset loop and a timing loop may be run during preamble 202. Ideally, preamble 202 can also be used to adjust the VGA gain to a value suitable for user data portion 204.

In some embodiments, both preamble 202 and user data portion 204 are used to adjust the VGA gain. The automatic gain control (AGC) circuit for adjusting the VGA gain during preamble 202 is referred to as an acquisition gain-loop, while the AGC circuit for adjusting the VGA gain during user data portion 204 is referred to as a tracking gain-loop. The acquisition gain-loop adjusts the VGA gain during preamble 202 such that the preamble amplitude at the input of ADC 106 converges to a preamble target amplitude $A_t$, while the tracking gain-loop adjusts the VGA gain such that the signal range at the input of ADC 106 effectively utilizes the full range of ADC 106. The advantage of having an acquisition gain-loop during preamble 202 is that it is based on a known data pattern with no risk of erroneous adjustment, which is possible in a decision directed gain-loop. In some other techniques, an acquisition gain-loop is run during the preamble sequence, but there is no tracking gain-loop being run during the user data portion: in particular, the acquisition gain-loop is frozen at the end of the preamble sequence, and the converged VGA gain is then used for scaling the user data as well. However, because the length of preamble 202 cannot be very long, and because any received signal range variation in the middle of a sector cannot be compensated by the acquisition gain-loop, running an acquisition gain-loop alone may result in performance degradation. Therefore, in the present application, a tracking gain-loop is used to adjust the VGA gain during user data portion 204 as well.

Figure 3:
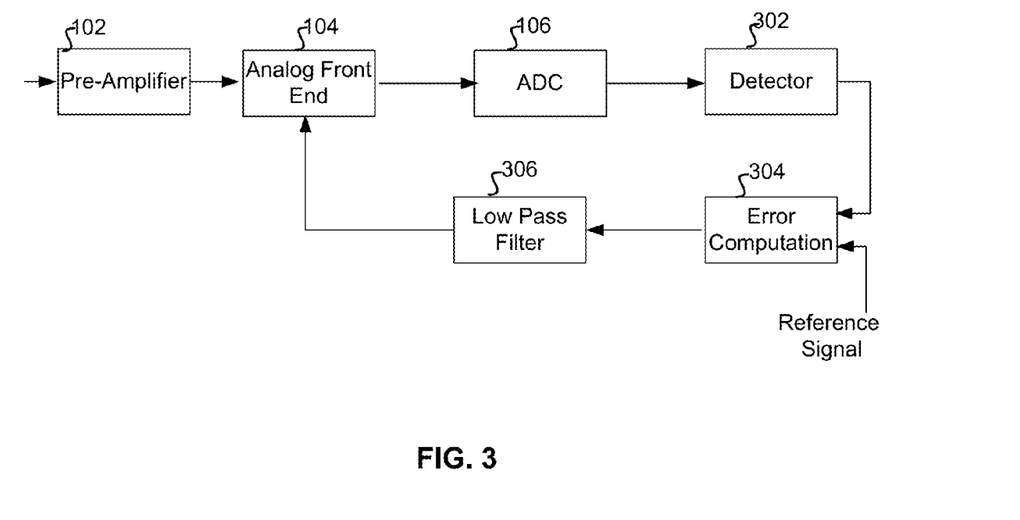
FIG. 3 is a block diagram illustrating an embodiment of a tracking gain-loop for adjusting the VGA gain during the user data portion of a sector of a magnetic disk.

FIG. 3 is a block diagram illustrating an embodiment of a tracking gain-loop for adjusting the VGA gain during the user data portion of a sector of a magnetic disk. As shown, the signal from a disk is first amplified by pre-amplifier 102. The amplified signal then passes through AFE 104 before it is sampled by ADC 106. AFE 104 includes a variable-gain amplifier (VGA) to scale the signal range at the input of ADC 106. Ideally, the signal range at the input of ADC 106 should effectively utilize the full range of ADC 106 for best signal resolution. Decisions are made using a detector 302. The detected signal is then compared with a reference signal having the desired signal amplitude using an error computation block 304. The output of error computation block 304 is filtered by a low pass filter 306 and then fed back as input to AFE 104 for adjusting the gain of the VGA. Note that the reference signal may be generated using different techniques. In some embodiments, the reference signal may be generated by a pulse shape estimator (PSE), as described below and shown in FIG. 4.

Figure 4:
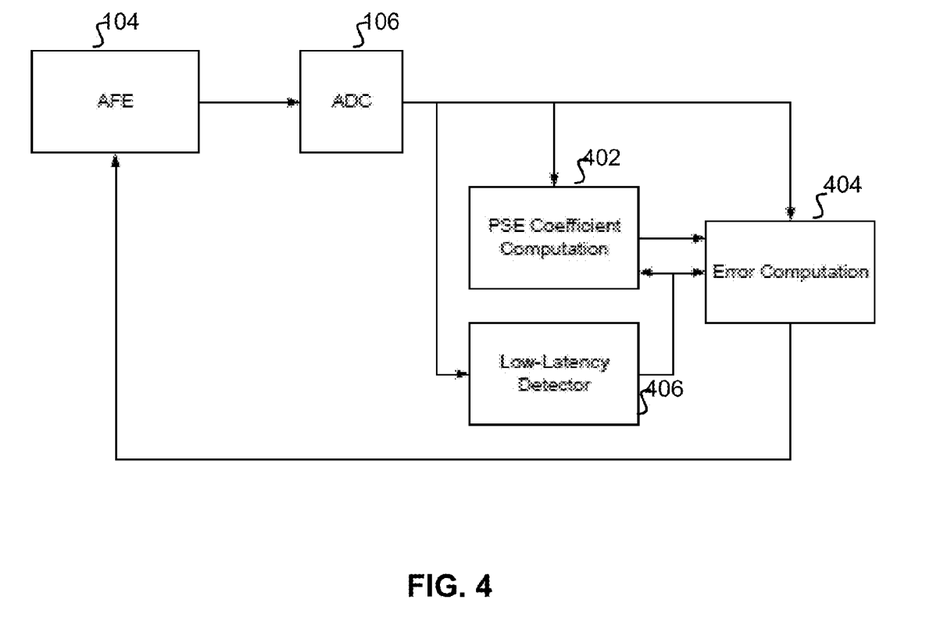
FIG. 4 is a block diagram illustrating a second embodiment of a tracking gain-loop for adjusting the VGA gain during the user data portion of a sector of a magnetic disk.

FIG. 4 is a block diagram illustrating an embodiment of a tracking gain-loop for adjusting the VGA gain during the user data portion of a sector of a magnetic disk. It is a decision directed gain control with a pulse shape estimator. The gain is controlled digitally (i.e., post-ADC), by first making an estimate of the channel pulse-response (shown as the PSE Coefficient Computation) using the ADC samples and decisions made with a low-latency detector. The estimated channel pulse-response is then distorted artificially such that it represents a pulse-response with the desired signal amplitude. In doing so, the error computed by the Error Computation block will reflect this distortion and will act to compensate it by adapting the VGA gain in a closed-loop. Thus, the VGA compensation will settle to a value which matches the ADC signal amplitude with the (artificially modified) pulse-shape amplitude.

Figure 5:
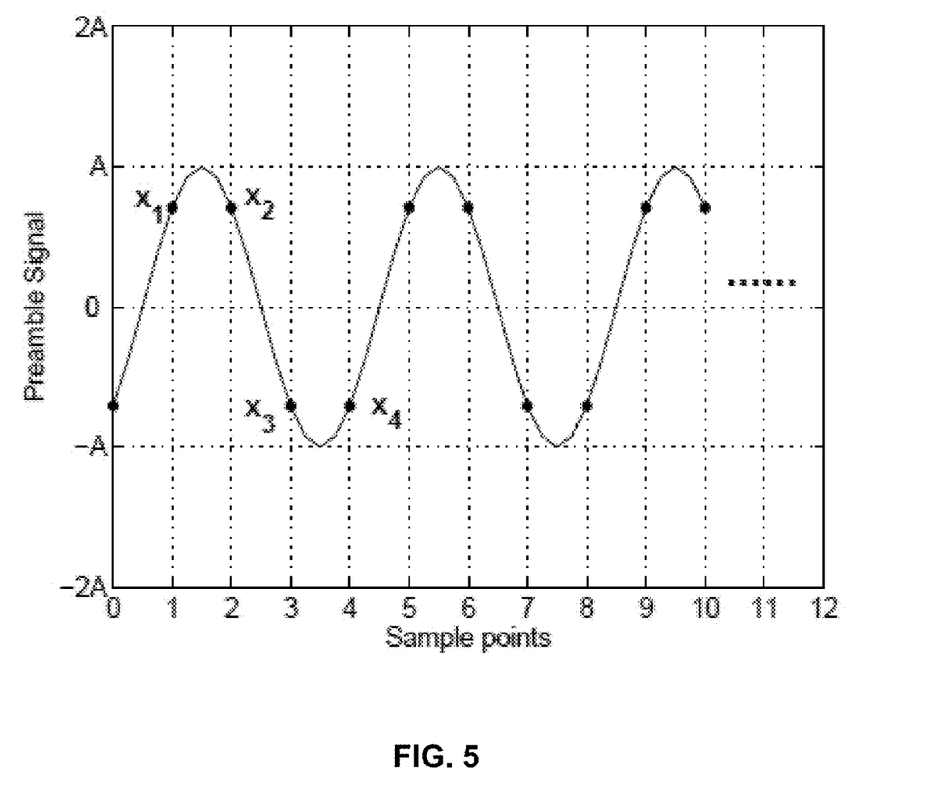
FIG. 5 is a diagram illustrating that a preamble may be approximated by a sin-wave.

FIG. 5 is a diagram illustrating that a preamble may be approximated by a sin-wave. As described above, the preamble includes repetitions of the bit pattern [+1 +1 −1 −1]. Because of the inter-symbol interference (ISI) within the signal and assuming that noise is not significant, the preamble waveform may be approximated by a sine-wave as shown in FIG. 5. The amplitude of such a sine-wave like preamble waveform can be estimated as $$A = 0.5\sqrt{(x_1-x_3)^2 + (x_2-x_4)^2} \qquad \text{Equation 1}$$

where $x_1$ to $x_4$ are four consecutive ADC samples within a single period of the preamble waveform. The four ADC samples $x_1$ to $x_4$ are sampled 90° out of phase from each other. Note that the samples $x_1$ to $x_4$ do not have to be side sampled as shown in FIG. 5. Equation 1 holds as long as the phase shift between consecutive samples is the same and equal to ¼ of the sine wave period. Equation 1 may be used to adjust the VGA gain during the preamble as described in greater detail below.

Figure 6:
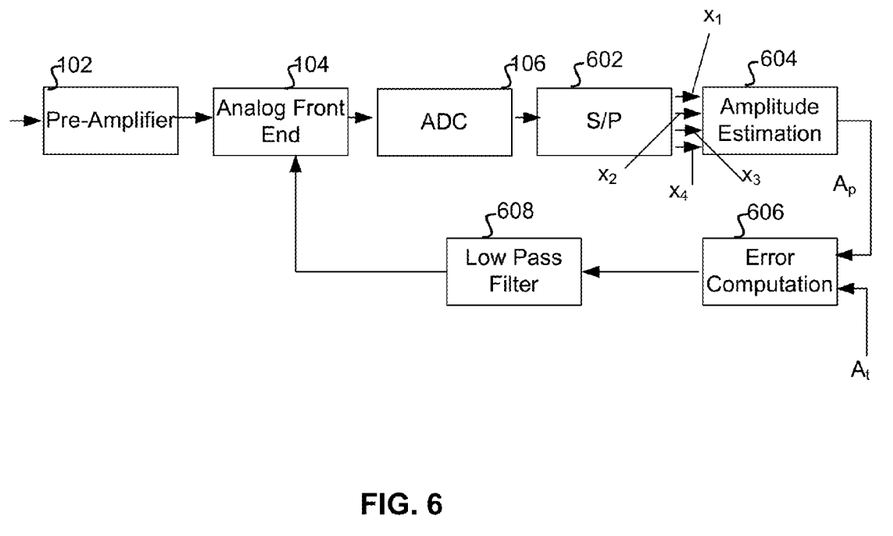
FIG. 6 is a block diagram illustrating an embodiment of an acquisition gain-loop for adjusting the VGA gain during the preamble portion of a sector of a magnetic disk.

FIG. 6 is a block diagram illustrating an embodiment of an acquisition gain-loop for adjusting the VGA gain during the preamble portion of a sector of a magnetic disk. The acquisition gain-loop will cause the magnitude of the preamble at the input of ADC 106 to converge to a preamble target amplitude $A_t$ by adjustment of the VGA gain. As shown, the signal read from a disk is first amplified by pre-amplifier 102. The amplified signal then passes through AFE 104 before it is sampled by ADC 106. AFE 104 includes a variable-gain amplifier (VGA) to scale the signal range at the input of ADC 106. The output of ADC 106 then passes through a serial-to-parallel converter 602. Serial-to-parallel converter 602 provides the samples, $x_1$ to $x_4$, to an amplitude estimation block 604. As described above, $x_1$ to $x_4$ are four consecutive ADC samples within a single period of the preamble waveform. Amplitude estimation block 604 then estimates the preamble amplitude by evaluating Equation 1 above. The estimated preamble amplitude is referred to as $A_p$. $A_p$ is then compared with the preamble target amplitude $A_t$ using an error computation block 606. The output of error computation block 606 is then filtered by a low-pass filter 608 and then fed back as input to AFE 104 for adjusting the gain of the VGA.

With two separate gain-loops for a magnetic recording system, the converged VGA gain for the preamble and the converged VGA gain for the user data portion may not be consistent with each other. This may result in a gain transient period, which may worsen the performance of the magnetic recording system.

In the present application, techniques for determining a preamble target amplitude $A_t$ for adjusting the VGA gain of an acquisition gain-loop during the preamble portion of a sector of a magnetic disk are disclosed. In some embodiments, the preamble target amplitude $A_t$ is determined such that the converged VGA gain for the preamble is consistent with the converged VGA gain for the user data portion. As such, this technique can reduce the gap between the converged VGA gain for the preamble and the converged VGA gain for the user data portion and thus reduce the transient effects associated with the transition from the preamble portion to the user data portion of the signal, thereby improving the performance of the magnetic recording system.

Figure 7:
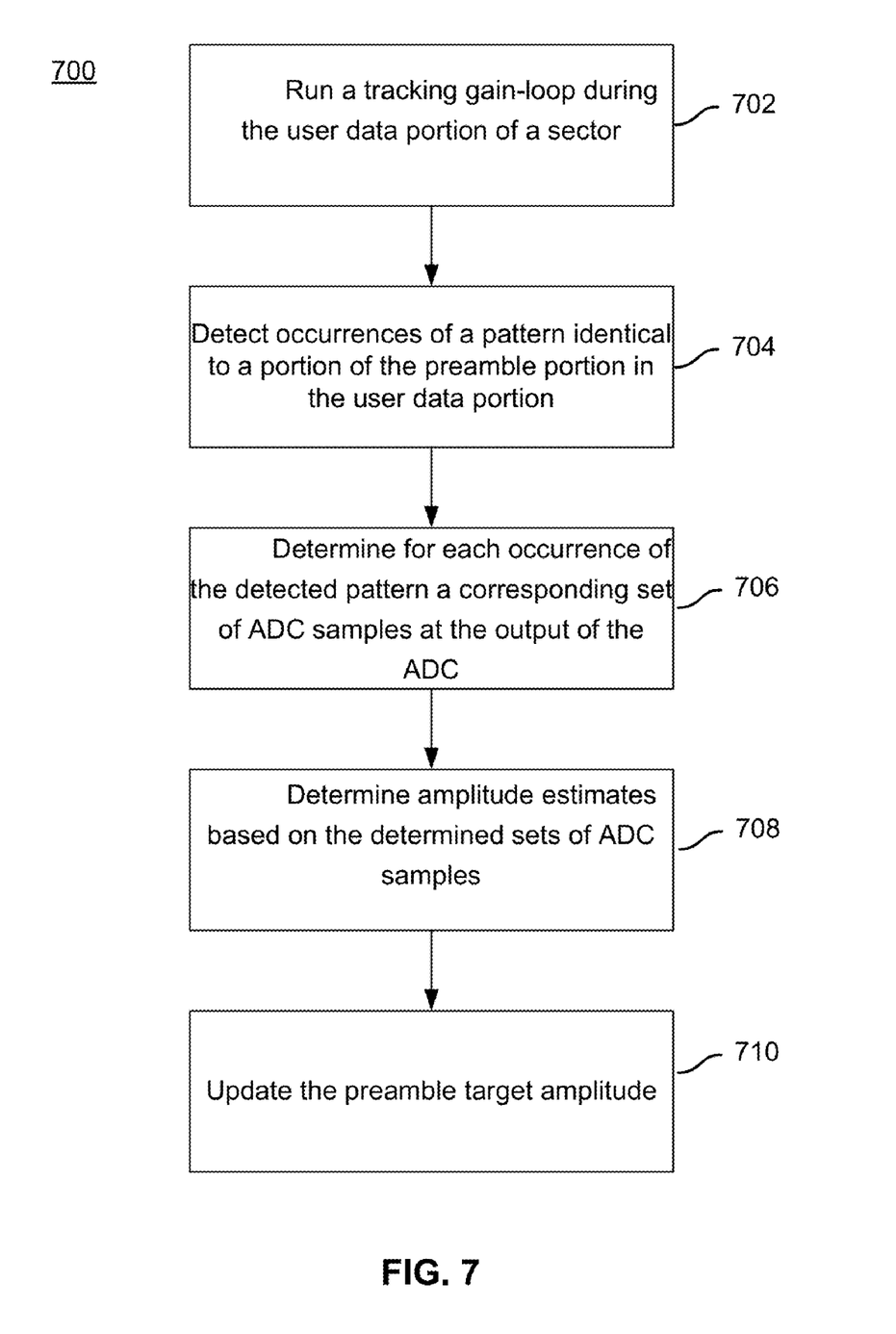
FIG. 7 is a flow chart illustrating an embodiment of a process for determining a preamble target amplitude $A_t$ for adjusting the VGA gain of an acquisition gain-loop during the preamble portion of a sector of a magnetic disk.

FIG. 7 is a flow chart illustrating an embodiment of a process 700 for determining a preamble target amplitude $A_t$ for adjusting the VGA gain of an acquisition gain-loop during the preamble portion of a sector of a magnetic disk. At 702, a tracking gain-loop is run during the user data portion of a sector of a magnetic disk. For example, the tracking gain-loop shown in FIG. 3 or FIG. 4 may be used. The tracking gain-loop adjusts the VGA gain such that the signal range at the input of ADC 106 effectively utilizes the full range of ADC 106 for best signal resolution. In some embodiments, the desired signal range is based on the dynamic range of the ADC.

At 704, occurrences of a pattern identical to a portion of the preamble portion are detected in the user data portion; specifically, a low latency detector may be used to detect the bit sequence of the user data portion, and occurrences of a pattern identical to a portion of the preamble portion within the bit sequence are detected. Since the user data are basically random, the user data portion includes different bit patterns. For example, a truncated version of an 84-bit long preamble bit pattern may be detected in the user data portion with some probability. Assuming that the user data portion is an independent and identically distributed (i.i.d.) bit stream, the probability of a 4-bit long truncated preamble bit pattern [+1 +1 −1 −1] occurring in the user data portion is $(0.5)^4$=0.0625, i.e., 1 in 16, because the probability of the first bit being +1 is 0.5, the probability of the second bit being +1 is 0.5, the probability of the third bit being −1 is 0.5, and so on. Similarly, the probability of a 7-bit long truncated preamble bit pattern [+1 +1 −1 −1 +1 +1 −1] occurring in the user data portion is $(0.5)^7$=0.0078125, i.e., 1 in 128. A longer truncated preamble bit pattern resembles the actual preamble more than a shorter truncated preamble bit pattern. However, as the truncated preamble bit pattern becomes longer, the probability that the bit pattern occurs within the user data portion becomes smaller. For example, if the user data portion of a sector is 4096 bits long, a total of 128 occurrences (4096/16=256) of a 4-bit long truncated preamble bit pattern are expected, while a total of only 32 occurrences (4096/128=32) of a 7-bit long truncated preamble bit pattern are expected. Therefore, in some embodiments, the length of the truncated preamble bit pattern is selected based on the length of the preamble to ensure that at least some occurrences of the truncated preamble bit pattern can be found in the user data portion.

At 706, for each occurrence of the detected pattern, a corresponding set of ADC samples at the output of the ADC is determined. In some embodiments, one detected truncated preamble bit pattern is [+1 +1 −1 −1], and four consecutive ADC samples, $x_1$ to $x_4$, corresponding to the bit pattern may be fed into a serial-to-parallel converter to obtain a set of four samples, which may be used as an input for computing an amplitude estimate as described next.

At 708, a plurality of amplitude estimates $\hat{A}$ are determined based on the determined sets of ADC samples. Each amplitude estimate $\hat{A}$ estimates the amplitude of the preamble portion at the input of the ADC. In some embodiments, if n occurrences of a 4-bit long truncated preamble bit pattern are found in the user data portion (for example, n=128), then n sets of $x_1$ to $x_4$ may be used to determine n amplitude estimates $\hat{A}$ using Equation 1.

At 710, the preamble target amplitude $A_t$ is updated. Since the amplitude estimates $\hat{A}$ determined at 708 are noisy, in some embodiments a moving average of the amplitude estimates $\hat{A}$ determined at 708 may instead be used to update the preamble target amplitude $A_t$. In some embodiments, the amplitude estimates $\hat{A}$ determined at 708 may be passed through a low-pass filter and the output used to update the preamble target amplitude $A_t$.

The preamble target amplitude $A_t$ obtained from 710 in process 700 may be used to adjust the VGA gain of an acquisition gain-loop during the preamble portion of a sector, as shown in FIG. 6. The acquisition gain-loop causes the magnitude of the preamble at the input of ADC 106 to converge to the preamble target amplitude $A_t$ through adjustment of the VGA gain. For example, a preamble target amplitude $A_t$ determined from a user data portion of sector N on a disk may be used to adjust the VGA gain of an acquisition gain-loop during the preamble portion of sector N+1.

In process 700, the tracking gain-loop causes the VGA to converge to a value G. As the VGA gain approaches the value G, the preamble target amplitude $A_t$ obtained from 710 predicts what the amplitude of a preamble will be when the VGA gain of the acquisition gain-loop is also G. Therefore, both the acquisition gain-loop and the tracking gain-loop will be consistent with each other and converge to the same gain value, thus improving the overall performance of the recording system.

Figure 8:
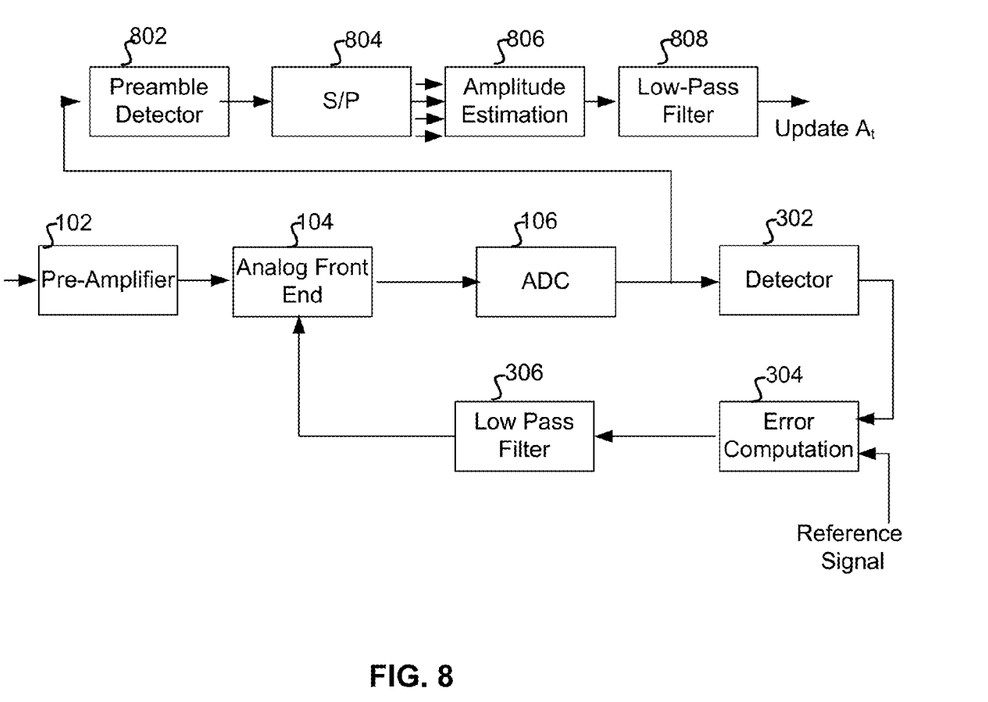
FIG. 8 is a block diagram illustrating an embodiment of a portion of a recording system, including a tracking gain-loop and a plurality of blocks for determining a preamble target amplitude for adjusting the VGA gain of an acquisition gain-loop during the preamble portion of a sector of a disk.

FIG. 8 is a block diagram illustrating an embodiment of a portion of a recording system, including a tracking gain-loop and a plurality of blocks for determining a preamble target amplitude $A_t$ for adjusting a VGA gain of an acquisition gain-loop during the preamble portion of a sector of a disk. The block diagram in FIG. 8 may be used to implement process 700 as described above. As shown in FIG. 8, the tracking gain-loop is the same as the one illustrated in FIG. 3. However, the tracking gain-loop illustrated in FIG. 4 may be used as well. While the tracking gain-loop is running, truncated preamble bit patterns are detected by preamble detector 802. The ADC samples that correspond to the detected truncated preamble bit patterns are fed into a serial-to-parallel converter 804 to obtain sets of four samples, which may be used as input to an amplitude estimation block 806. Amplitude estimation block 806 determines a plurality of amplitude estimates $\hat{A}$ based on Equation 1. In some embodiments, the amplitude estimates $\hat{A}$ are further filtered by a low-pass filter 808. The output of low-pass filter 808 may be used to update the preamble target amplitude $A_t$, which may be used to adjust the VGA gain of the acquisition gain-loop.

Figure 9:
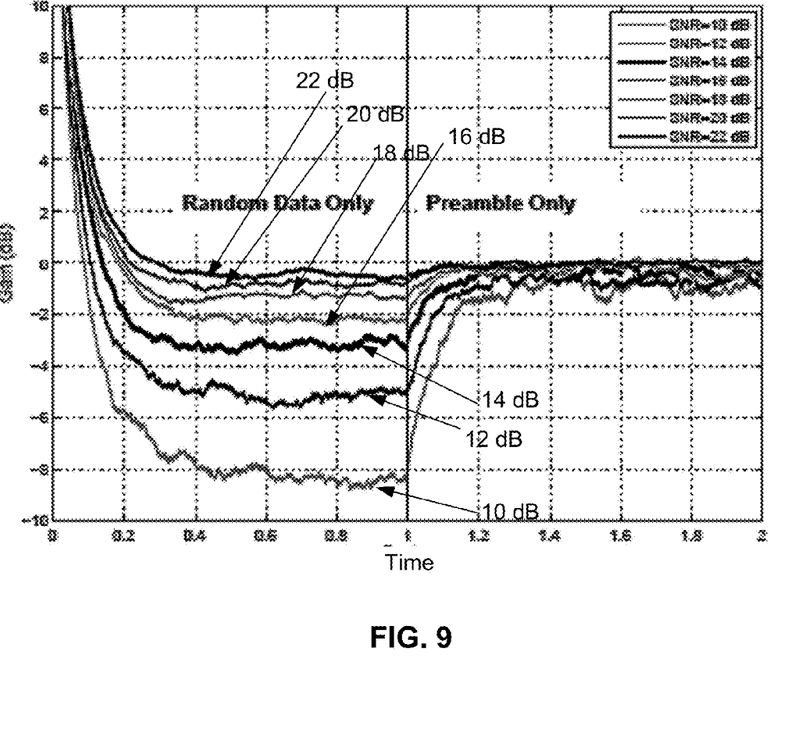
FIG. 9 is a diagram illustrating an exemplary plot of the VGA gain during the preamble portions and the user data portions of sectors on a disk using some other techniques.

FIG. 9 is a diagram illustrating an exemplary plot of the VGA gain during the preamble portions and the user data portions of sectors on a disk using some other techniques. As shown in the plot, the VGA gain during the user data portions converges to different values at different signal-to-noise ratios (SNRs). When the SNR is high, e.g., at 22 dB, the converged VGA gain for the user data portion is close to the converged VGA gain for the preamble. However, when the SNR is low, e.g., at 10 dB, there is a gap between the two converged VGA gains, causing a transient at the transition from the user data portion to the preamble portion.

Figure 10:
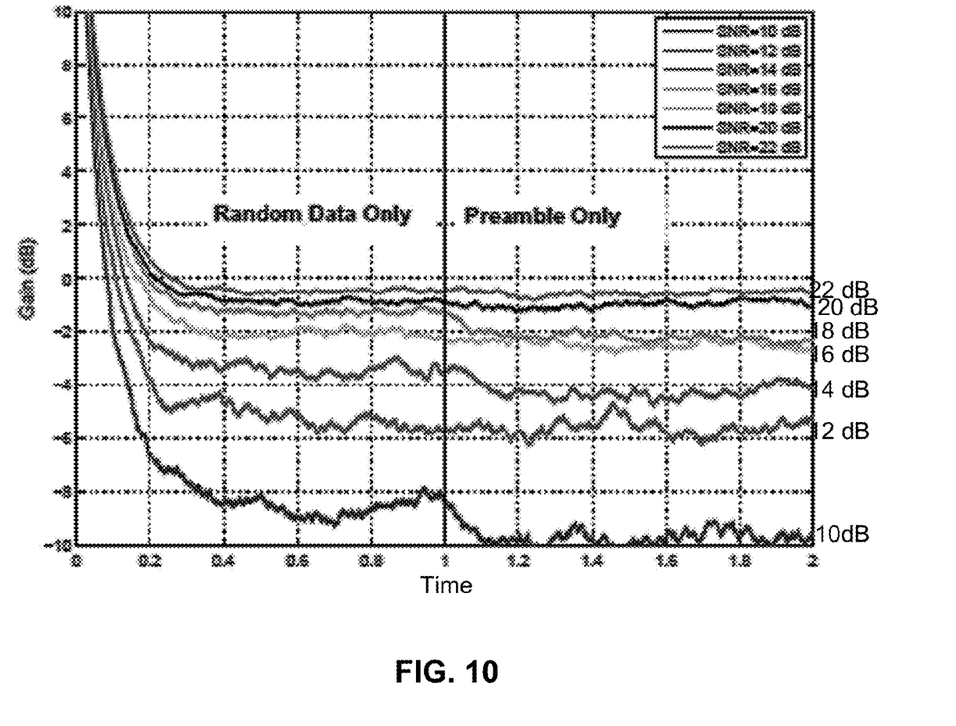
FIG. 10 is a diagram illustrating an exemplary plot of the VGA gain during the preamble portions and the user data portions of sectors on a disk using the techniques presented in the present application.

FIG. 10 is a diagram illustrating an exemplary plot of the VGA gain during the preamble portions and the user data portions of sectors on a disk using the techniques presented in the present application. As shown in the plot, the VGA gain during the user data portions converges to different values at different signal-to-noise ratios (SNRs). The converged VGA gain for the user data portion is close to the converged VGA gain for the preamble irrespective of the SNR. Therefore, both the acquisition gain-loop and the tracking gain-loop are consistent with each other and converge to the same gain value, thus improving the overall performance of the recording system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining a target amplitude for an acquisition gain-loop, comprising:
   a tracking gain-loop configured to adjust a gain of the tracking gain-loop during a data portion of the received signal, wherein the received signal comprises an acquisition portion and the data portion;
   an acquisition gain-loop configured to adjust a gain of the acquisition gain-loop during the acquisition portion of the received signal;
   a detector configured to detect a portion in the data portion, wherein the detected portion comprises an occurrence of a pattern identical to a portion of the acquisition portion;
   an amplitude estimation block configured to compute an amplitude estimate based at least in part on the detected portion; and
   a target amplitude updating block configured to update the target amplitude based at least in part on the amplitude estimate.

2. The system of claim 1, wherein the amplitude estimate estimates an amplitude of the acquisition portion at the input of an analog-to-digital converter (ADC).

3. The system of claim 1, wherein the acquisition gain-loop is configured to cause an amplitude of the acquisition portion at the input of an analog-to-digital converter (ADC) to converge to the target amplitude.

4. The system of claim 1, wherein the tracking gain-loop is configured to scale the data portion at the input of an analog-to-digital converter (ADC) to a desired range, the desired range based on a dynamic range of the ADC.

5. The system of claim 1, wherein updating the target amplitude includes computing a moving average based on the amplitude estimate.

6. The system of claim 1, wherein updating the target amplitude includes filtering the amplitude estimate with a low-pass filter.

7. The system of claim 1, the detector further configured to determine for the detected portion a corresponding set of analog-to-digital converter (ADC) samples at the output of an ADC.

8. The system of claim 7, wherein computing the amplitude estimate based at least in part on the detected portion comprises computing the amplitude estimate based at least in part on the corresponding set of ADC samples.

9. The system of claim 8, wherein the acquisition portion comprises repeated bit patterns of [+1 +1 −1 −1].

10. The system of claim 9, wherein the corresponding set of ADC samples includes four consecutive ADC samples, the consecutive ADC samples being sampled ninety degrees out of phase from each other.

11. The system of claim 9, wherein the amplitude estimate is determined based on an equation approximating the acquisition portion as a sine-wave.

12. A method for determining a target amplitude for an acquisition gain-loop, comprising:
    receiving a signal having an acquisition portion and a data portion;
    running an acquisition gain-loop during the acquisition portion of the received signal;
    running a tracking gain-loop during the data portion of the received signal;
    detecting a portion in the data portion, wherein the detected portion comprises an occurrence of a pattern identical to a portion of the acquisition portion;
    computing an amplitude estimate based at least in part on the detected portion; and
    updating the target amplitude based at least in part on the amplitude estimate.

13. The method of claim 12, wherein the amplitude estimate estimates an amplitude of the acquisition portion at the input of an analog-to-digital converter (ADC).

14. The method of claim 12, wherein the acquisition gain-loop is configured to cause an amplitude of the acquisition portion at the input of an analog-to-digital converter (ADC) to converge to the target amplitude.

15. The method of claim 12, wherein the tracking gain-loop is configured to scale the data portion at the input of an analog-to-digital converter (ADC) to a desired range, the desired range based on a dynamic range of the ADC.

16. The method of claim 12, wherein updating the target amplitude includes computing a moving average based on the amplitude estimate.

17. The method of claim 12, wherein updating the target amplitude includes filtering the amplitude estimate with a low-pass filter.

18. The method of claim 12, further comprising determining for the detected portion a corresponding set of analog-to-digital converter (ADC) samples at the output of an ADC.

19. The method of claim 18, wherein computing the amplitude estimate based at least in part on the detected portion comprises computing the amplitude estimate based at least in part on the corresponding set of ADC samples.

20. The method of claim 19, wherein the acquisition portion comprises repeated bit patterns of [+1 +1 −1 −1].

21. The method of claim 20, wherein the corresponding set of ADC samples includes four consecutive ADC samples, the consecutive ADC samples being sampled ninety degrees out of phase from each other.

22. The method of claim 20, wherein the amplitude estimate is determined based on an equation approximating the acquisition portion as a sine-wave.

23. A computer program product for determining a target amplitude for an acquisition gain-loop, the computer program product being embodied in a non-transitory computer readable storage medium and comprising computer instructions for:
    receiving a signal having an acquisition portion and a data portion;
    running an acquisition gain-loop during the acquisition portion of the received signal;
    running a tracking gain-loop during the data portion of the received signal;

detecting a portion in the data portion, wherein the detected portion comprises an occurrence of a pattern identical to a portion of the acquisition portion;

computing an amplitude estimate based at least in part on the detected portion; and updating the target amplitude based at least in part on the amplitude estimate.

24. The computer program product of claim 23, further comprising determining for the detected portion a corresponding set of analog-to-digital converter (ADC) samples at the output of an ADC.

25. The computer program product of claim 24, wherein computing the amplitude estimate based at least in part on the detected portion comprises computing the amplitude estimate based at least in part on the corresponding set of ADC samples.

26. The computer program product of claim 25, wherein the acquisition portion comprises repeated bit patterns of [+1 +1 −1 −1].

27. The computer program product of claim 26, wherein the corresponding set of ADC samples includes four consecutive ADC samples, the consecutive ADC samples being sampled ninety degrees out of phase from each other.

28. The computer program product of claim 26, wherein the amplitude estimate is determined based on an equation approximating the acquisition portion as a sine-wave.

\* \* \* \* \*